Dec. 27, 1949  F. H. HANLEY  2,492,282
AUTOMOBILE REAR-VISION WINDOW CONTROL COMPARTMENT
Filed Nov. 19, 1946  3 Sheets-Sheet 1

Inventor
FRANK H. HANLEY
By Clarence A. O'Brien
and Harvey B. Jacobson
Attorneys

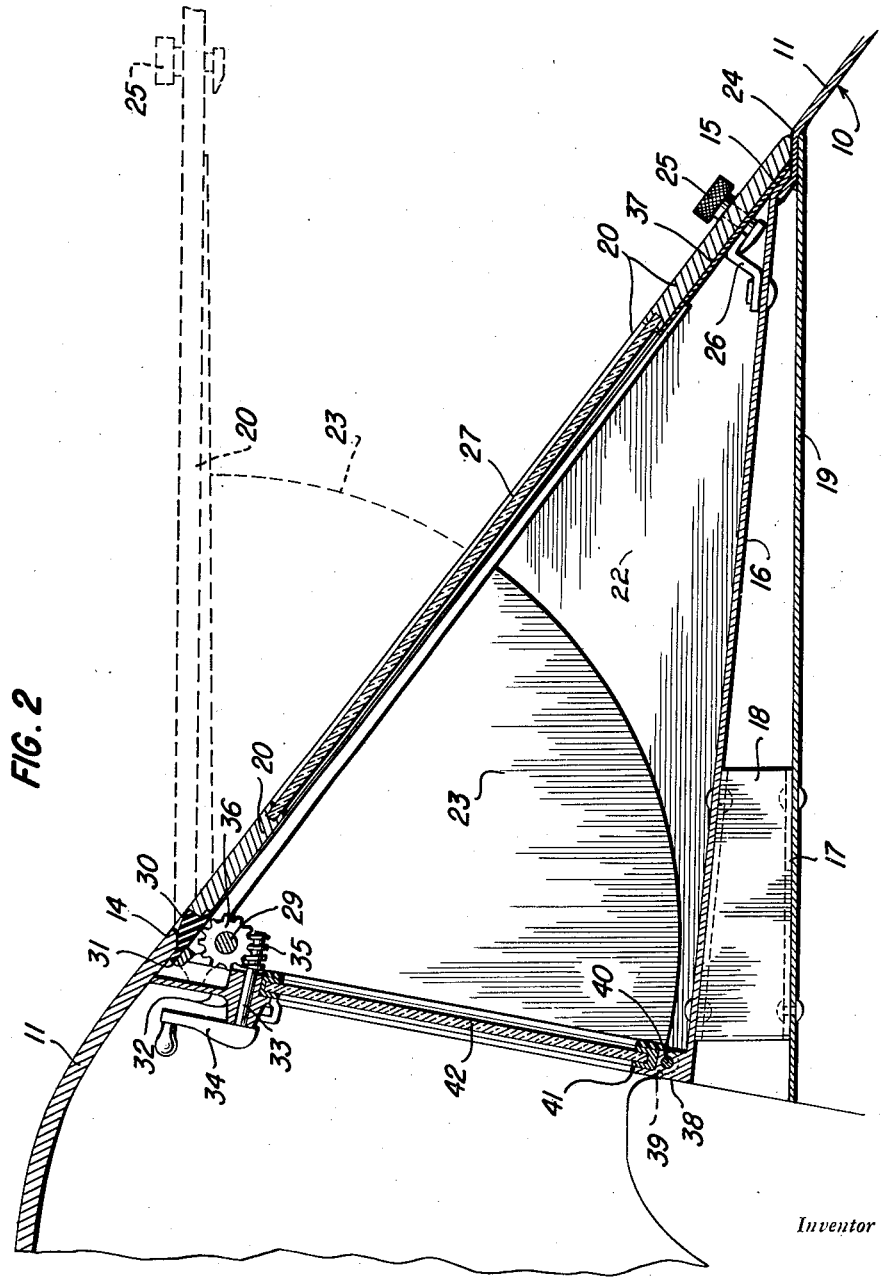

Dec. 27, 1949            F. H. HANLEY            2,492,282
AUTOMOBILE REAR-VISION WINDOW CONTROL COMPARTMENT
Filed Nov. 19, 1946            3 Sheets-Sheet 3
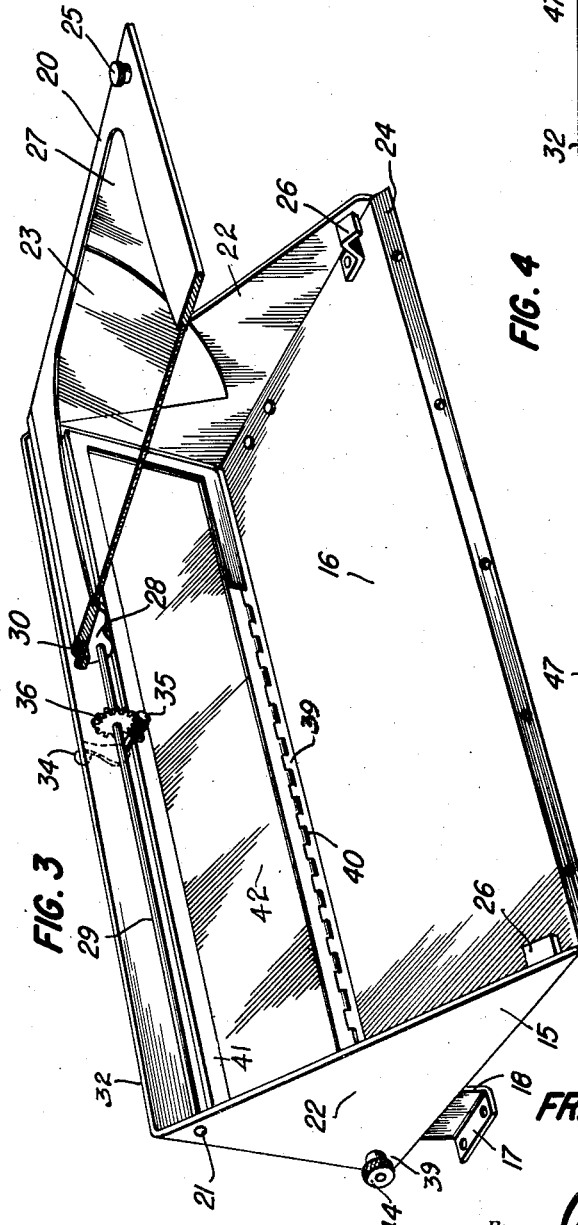
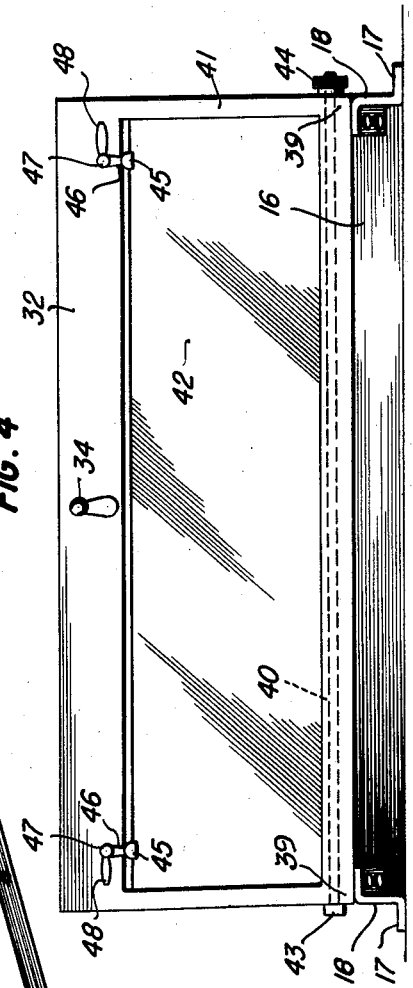
Inventor
FRANK H. HANLEY
By *Clarence A. O'Brien and Harvey B. Jacobson*
                                     Attorneys Patented Dec. 27, 1949

2,492,282

UNITED STATES PATENT OFFICE 2,492,282

AUTOMOBILE REAR-VISION WINDOW CONTROL COMPARTMENT

Frank H. Hanley, Detroit, Mich.

Application November 19, 1946, Serial No. 710,917

4 Claims. (Cl. 296—44)

This invention relates to rear view or vision control means for automobiles and the like adapted to avoid obscuring or obstructing of clear vision in rear of an automobile from the driver of a car while looking at the customary rear-vision mirror located over the windshield in front of the driver, in inclement weather from rain, sleet or snow, thereby preventing many serious accidents.

The object of the invention is to provide an automobile rear-vision window control compartment by which the rear window is mounted so as to preserve the stream lines of the body and top of the automobile at the rear and over the rear storage or trunk compartment, but is adapted to be elevated to an open position so that a clear line of vision is established beneath the same to give unobstructed view in rear of the automobile by reflected image in the usual rear view mirror in front of the driver and adapted to exclude rain, sleet or snow from entering a rear compartment therebeneath, which is provided with a second window at the front thereof constituting an inner window angled to a degree inward from a vertical line or line of gravity to seal said compartment from the interior of the car body without interfering with clear vision and adapted to be open for air conditioning or ventilation in the summer time, means being provided for holding both windows in adjusted open positions and when closed.

Another object of the invention is to provide a rear-vision window control compartment whereby the operator will have a clear, unobstructed view of the rear when looking into the usual rear-view or vision mirror located in front of the operator without interference by cross reflection or refraction and while maintaining and preserving the stream lines of the automobile.

Another object of the invention is to provide an automobile rear-view or vision window control compartment having windows adapted to be thoroughly sealed against the entrance of rain, sleet or snow when closed and in cold weather when warmth within the car is desired.

Another object of the invention is to provide a rear window structure of the character stated which will drain any water, sleet or snow in the rear compartment thereof, while primarily constructed to prevent the entrance thereof into said compartment, and which can be readily applied to automobiles as heretofore constructed and designed, or as especially designed for the purpose, in addition to being economical to manufacture, capable of ready adjustment, and adapted for different shapes of body styles and angles of the body structure of various types of cars, as well as capable of being readily and quickly mounted in position.

Another object of the invention is to provide a rear compartment having an inner window which is protected from the weather by an outer window when the first window is closed and the outer window open, and it is desired to seal the interior of the car in the winter months, or permitting the opening of both windows for ventilation during the summer months, the inner window being so angled that no water will drip on it, thereby insuring a clear and unobstructed view of the rear at the rear-vision mirror located in front of the operator.

Other objects and advantages reside in the details of construction and operation as more fully hereinafter described and claimed, reference being had to the accompanying drawings forming part hereof, wherein like reference numerals refer to like parts throughout, and in which:

Figure 2 is an enlarged fragmentary sectional view showing the outer rear window closed as distinguished from the open position shown in Figure 1, in solid lines, and open in dotted lines, and the adjustment and fastening means therefor;

Figure 3 is a sectional perspective view showing the rear window compartment, windows and adjustment means therefor; and Figure 4 is an inside elevation looking at the window in closed position.

Figure 1:
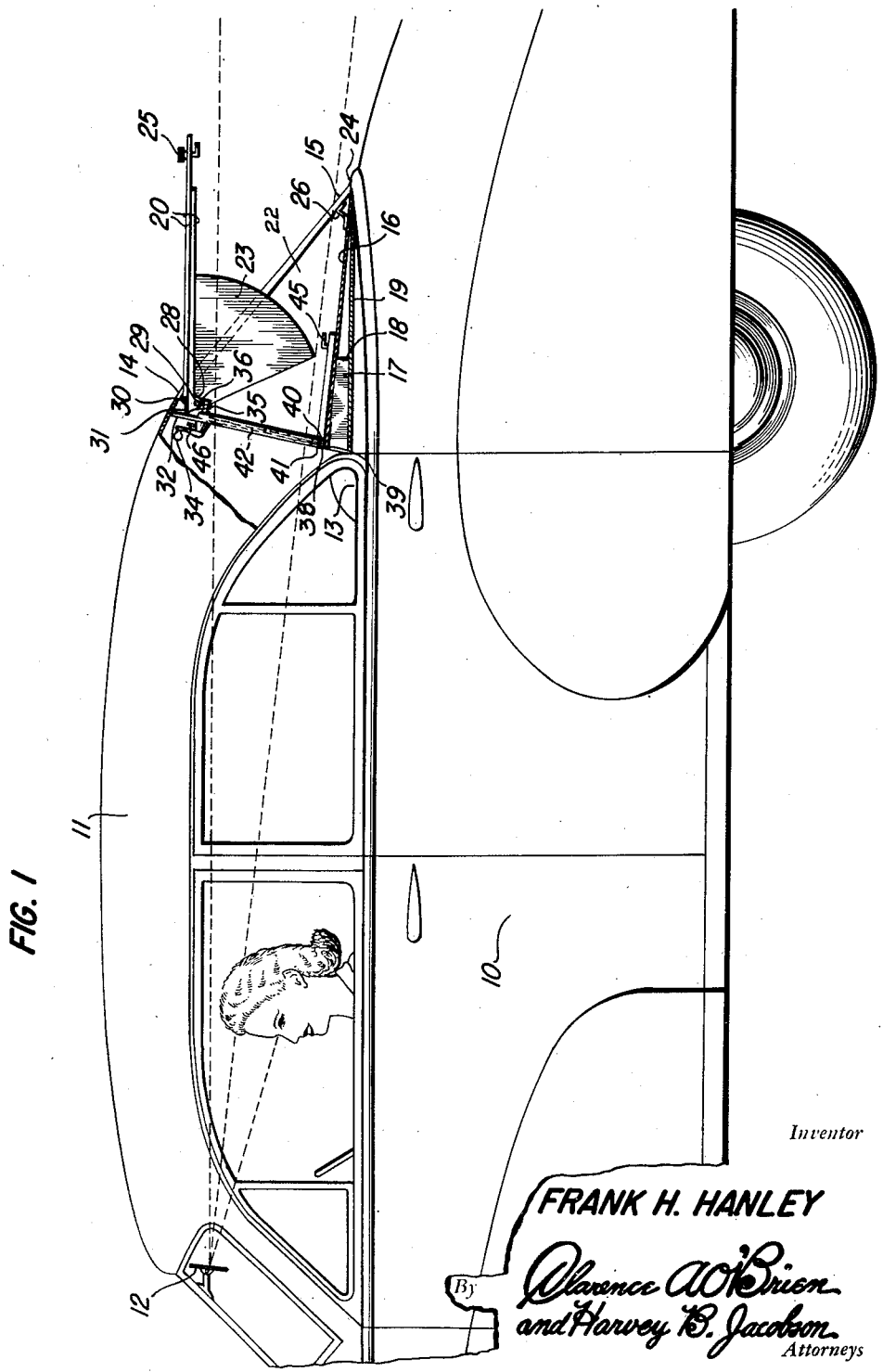
Figure 1 is a side elevation partly in section showing an automobile equipped with the rear-vision window control compartment in accordance with the present invention.

Referring to the drawings in detail, in which like reference characters designate corresponding parts throughout the several views, and in illustrating the application of the invention, there is shown an automobile 10 having the top 11, the usual rear view mirror 12 positioned in front of the driver or operator for viewing in rear of the automobile. With the customary rear-view window provided over the rear seat 13 at the back of the body of the automobile and top 11, usually disposed in an inclined position for preserving the body contour and stream line of the automobile body, the rear view or vision is usually obstructed by rain, sleet or snow, thereby resulting in serious accidents. The present invention provides a rear vision window control compartment and window arrangement which, instead of the usual fixed rear-view window at the rear of the body and over the rear storage or trunk compartment, is adapted to be open to protect an inner window from the rain, sleet or snow or dripping of rain thereon or from the water entering the compartment, while permitting the interior body of the car to be closed and sealed against the entrance thereof, or of cold in the winter months or inclement weather, while permitting the same to be open for ventilation in the summer time. For this purpose, the usual opening 14 provided in the rearwardly sloping portion of the top 11 at the back over the trunk compartment is provided, and over the shelf provided in back of the rear seat, receives a comparatively triangular frame structure 15 including a bottom or pan 16 having a slope rearwardly, such as at a five degree angle on the bottom of the frame structure for insuring draining of water therefrom to the rear. The sides include bracket structures also of triangular form, indicated at 17, tapering rearwardly and adapted to be anchored to the body of the car by means of side flanges 17 on which side flanges 18 sloping rearwardly are provided to take the bottom 16, the brackets serving to attach the same to a shelf or bottom plate 19. A rear-vision window 20 is set in the frame 15 and pivoted in bearings 21 at the sides 22, forming part of the triangular frame of metal or other suitable material, although the same may be glass covered, if desired. The window 20 carries segments 23, designed to close the sides of the compartment partially, to tend to eliminate the entrance of rain water, sleet or snow when the window 20 is open, although the latter is adapted to be closed when desired, and to fit a seat in the body or top at the frame 15, as indicated at 24, flush with the top and body, to preserve the stream lines of the automobile with the window in an inclined, rearwardly sloping position. In this position, the window is adapted to be fastened by means of clamps or fasteners 25 engaging beneath angular portions or formations 26 attached to or formed in the frame 15, as clearly shown in Figure 2 of the drawings. The frame 15 of the window has the usual panel 27, of non-shatterable glass, plastic, or the like. In order to pivotally mount the window 20, the same is supported by means of apertured lugs 28, secured to a shaft 29 mounted in the bearings 21 to turn and extending transversely beneath the overhanging portion 14 of the top 11 with arcuate gasket riders 30 designed to seal the same weather-tight against the edge 14 at any position of movement of the window 20 and to extend beneath the overhanging portion 14, as indicated at 31, to render the same weather-tight. The window 20 is adapted to be opened and closed by elevating or lowering the same, by suitable means, preferably from within the car, and for this purpose the top 11 is shown provided with depending bearing brackets 32 adapted to mount a shaft 33 having a suitable operating means, such as a handle or crank 34, for turning the same in geared connection with a shaft 29 and represented as a worm 35 engaging a worm gear 36 on the shaft 29, whereby the window 20 may be opened or closed. Thus, the window 20 will be effectively sealed at the seat, ledge or sill 24 and at the top and side edges with suitable interposed gaskets or packings 37 along the bottom and sides acting in conjunction with the rubber gaskets 30 and the projecting, overhanging seal 31 at the top.

Beneath the depending wall 32 supporting the bearing for the shaft 33 centrally of the rear compartment and window, a frame 38 is provided at the inner end of the frame 15 angled to a degree inward from a vertical line or line of gravity so as to slope inwardly to a slight degree and having bearings 39 at the bottom on which the pintle 40 of an inner window including a frame 41 and panel 42 is mounted. Any suitable hinge connection may be provided for this window at the bottom, but the same is shown with the pintle 40 headed at one end, as at 43, and having its opposite end threaded for engagement by a nut 44 so that it can be effectively clamped in any desired position, either closed or open to any desired degree, and frictionally held at the sides in any desired adjustment. At the top of the inner window, the frame thereof is provided with angular lugs 45 forming keepers to engage clamps or fasteners 46 pivoted at the top of the frame 15 adjacent each end of the window, as at 47, and having right angularly extending operating handles 48 whereby the inner window may be held closed to seal the interior of the car from the rear compartment and outside. However, by releasing the clamps or fasteners 46, the window may be lowered in the manner shown in Figure 1 of the drawings so as to permit ventilation of the interior of the car during the summer months, as distinguished from the closed position thereof, for sealing the interior of the car in the winter time, when the window 20 may also be closed, or when the latter is open to protect the inner window from rain water, sleet or snow, which would obstruct the rear vision of the driver, but which is raised to such an extent as to permit clear vision through the rear beneath said window when open, thus preventing serious accidents. Of course, in clear, cold, fair weather, the window 20 may be closed in addition to the inner window, and the compartment thus provided employed for any other purpose in connection with the shelf or bottom wall 19 and rearwardly sloping bottom 16 attached to the body at such points from the ends of the brackets 17, thereby adapting the device to cars heretofore constructed and designed, as well as to new designs. This renders the device very economical to manufacture and permits it to be quickly installed in cars. Thus, the operator is insured of clear, unobstructed view of the rear when looking in the reflection through the rear-view or vision mirror located in front of the operator at all times, while adapting the device to various types of automobiles now in use and future designs without any material change or modification in the structure, and without interfering with the usual manipulation of the automobile by the operator. Also, it will be observed that the outer rear window will operate in conjunction with the inner window to prevent interference with the rear vision of the operator, due to cross reflection or refraction, especially when open, and due to the forward tilt or angle of the inner window which will prevent the draining of water thereon due to it being set forward of a vertical line or line of gravity from the top. When open, the rear window will act as a canopy to prevent rain, sleet or snow from entering the compartment and interfering with a clear and unobstructed view to the rear through the inner window, thereby preventing many serious accidents. The frame can be readily bolted or otherwise secured and positioned so as to be removable and mounts the bearings for the windows as described. The rubber or other gaskets thoroughly seal the structure when closed, while the clamps permit the windows to be fastened in closed position without interfering with and while preserving the stream lines of the automobile, making it thoroughly waterproof. Since the fastening means for the windows are located at the inside, except the lower fastening means for the outside window, it is obvious that they can be easily fastened in closed positions, or operated from the inside to open the same. They will also be effectively held in any position adjusted by the operating means for the outer window and the frictional or binding clamping action of the lower pivoting and clamping means of the inner window simply by loosening and tightening the nut 44. Of course, other fastening means may be substituted therefor. Also, any desired degree of slope may be provided for the inner and outer windows and for the bottom drain 16 of the rear compartment closed by the front and rear windows as described. The fastening means are under control at all times, in the compartment or housing thereof and from within the car. The side shields or segments 23 will prevent the entrance of rain, sleet or snow from the sides being carried into the compartment by side winds. Obviously, the brackets for fastening the compartment housing and frame in position may be adjusted to suit any automobile body, and to conform to the shape, styles and angles of the body structure of various types of cars, while still providing a simple, durable and inexpensive construction that will advantageously and admirably serve the purposes for which it is intended.

While in the foregoing there has been shown and described the preferred embodiment of this invention, it is to be understood that minor changes in the details of construction and combination and arrangement of parts may be resorted to without departing from the spirit and scope of the invention as claimed.

Having thus described my invention, what I claim as new and desire to secure by Letters Patent of the United States is:

1. An automobile rear-vision window compartment construction including a casing having an inner window and an outer window, manually operable gear means for opening and closing said outer window, said outer window being pivoted at the top of said casing to swing upwardly or downwardly in open and closed positions, respectively, said inner window being pivoted at the bottom of said casing to swing downwardly and rearwardly to open position, and means to hold said inner window in adjusted positions.

2. The combination of claim 1 wherein said casing is triangular in cross-section and includes a base member, side members, and a vertically extending member having a window opening therein, said inner window being pivoted to said base member adjacent said window opening, said outer window being pivoted to said side members adjacent to the top of said vertically extending member.

3. The combination of claim 2 and segments carried by said outer window adjacent said side members and adapted to partially close said casing at the side members when said outer window is in an open position.

4. The combination of claim 3 and bracket means carried by said base member for securing said casing to the interior of the automobile, said base member extending downwardly and rearwardly of the automobile to serve as a drainage shelf.

FRANK H. HANLEY.

REFERENCES CITED

The following references are of record in the file of this patent:

UNITED STATES PATENTS

| Number | Name | Date |
|---|---|---|
| 1,556,778 | Forostovsky, Jr. | Oct. 13, 1925 |
| 2,023,699 | Robinson | Dec. 10, 1935 |
| 2,033,793 | Van Sinderen | Mar. 10, 1936 |
| 2,143,889 | Ledwinka | Jan. 17, 1939 |
| 2,171,801 | Morrison | Sept. 5, 1939 |
| 2,436,728 | Parsons | Feb. 24, 1948 |

FOREIGN PATENTS

| Number | Country | Date |
|---|---|---|
| 454,352 | Great Britain | Sept. 29, 1936 |